United States Patent [19]
Juvan

[11] Patent Number: 6,117,401
[45] Date of Patent: Sep. 12, 2000

[54] PHYSICO-CHEMICAL CONVERSION REACTOR SYSTEM WITH A FLUID-FLOW-FIELD CONSTRICTOR

[76] Inventor: Christian Juvan, 10053 Judy Ave., Cupertino, Calif. 95014

[21] Appl. No.: 09/129,016

[22] Filed: Aug. 4, 1998

[51] Int. Cl.[7] .............................. B01J 19/08; B01J 19/12
[52] U.S. Cl. ............................... 422/186.04; 422/186.08
[58] Field of Search ........................... 422/186.04, 186.18

[56] References Cited

U.S. PATENT DOCUMENTS

| | | | |
|---|---|---|---|
| 2,958,716 | 11/1960 | Lahr et al. | 260/679 |
| 3,093,770 | 6/1963 | Wesley et al. | 315/241 |
| 3,192,126 | 6/1965 | Van Dyck | 196/46 |
| 3,220,873 | 11/1965 | Wesley et al. | 117/93.1 |
| 3,223,747 | 12/1965 | Bohrer et al. | 260/674 |
| 3,223,748 | 12/1965 | Bohrer et al. | 260/674 |
| 3,240,689 | 3/1966 | Lauer | 204/156 |
| 3,332,870 | 7/1967 | Orbach et al. | 422/186.21 |

(List continued on next page.)

FOREIGN PATENT DOCUMENTS

| | | |
|---|---|---|
| 148380 | 12/1983 | Germany . |
| 44 40 813 A1 | 5/1995 | Germany . |

OTHER PUBLICATIONS

Liebmann, H, etal., *Moglichkeiten zur Intensivierung der Schlammfaulung*, Berichte der Abwassertechnischen Vereinigung, 1960 vol. 12, p. 100. No month available.

Carlson, S, *Niederer Wechselstrom und biologische Abwasserreinigung und Faulgasgewinnung*, Gesundheitsingenieur, 1953, No month available.

Kliewe, H, etal., *Uber den einfluss von wechselstromen auf die Lebensfunktion, auf den Stoffwechsel und die Vermehrungageschwindigkeit von Bakterien*, Archive fur hygiene und bakteriologie, 1952, vol. 163, Part 4. No month available.

Dax, Mark, *A Plethora of Plasma Sources to Consider for your Next Application* R&D Magazine, Oct. 1997, pp. 28–30.

Willberg, et al., *Electrohydraulic Destruction of Hazardous Wastes*, Chemtech, Apr. 1996, pp. 52–57.

Willberg, et al, *Electrohydraulic Discharge Treatment of Hazardous Wastes*, 2nd. Intl Symposium on Advanced Oxidation Tech, CA, Feb. 28–Mar. 3, 1996, pp. 121–122.

Vandendorpe, L., *Shock–wave Cracking Technology Comes Back to the Future*, R&D Magazine, Dec. 1996, pp. 23–26.

Gloyna, E.F. etal., *Engineering Aspects of Supercritical Water Oxidation*, Wat. Sci. Tech., vol. 30, No. 9, pp. 1–10, 1994, No month available.

Modell, M et al., *Supercritical Water Oxidation of Pulp Mill Sludges*, Tappi Journal, Jun. 1992, pp. 195–202.

Kodra, D etal., *Autothermal Oxidation of Dilute Aqueous Wastes under Supercritical Conditions*, Ind. Eng. Chem. Res., 1994, 33, 575–580, No month available.

Landry, C, *Improving Plasma Cutting in Sheet Metal Applications*, MetalForming, Sep. 1997, pp. 27–32.

Juvan, C, Patent Disclosure Writings, *Gas Injected Electrohydraulic Reactors* Feb. 1996 Disclosure Document 392942.

Juvan, C, *A Method of Improving The Conversion Efficiency of Certain Chemical Reactors* Juvan, C, Disclosure Document No. 425483, Sep. 7, 1997.

*Primary Examiner*—Kathryn Gorgos
*Assistant Examiner*—Wesley A. Nicolas

[57] ABSTRACT

In certain chemical reactors, particularly devices providing continuous processing of a flow of process media, with electrical or optical excitation, the chemical reactor efficiency per single pass can be improved by increasing the desired turbulence of the process media within the reaction zone and concentrating the electrical/optical field lines by the use of a Flow-Field Constrictor (FFC) located inside the reactor vessel to concentrate and intensify the flow of the process media (liquid or gaseous medium) and the electric field lines in the reaction zone.

2 Claims, 4 Drawing Sheets

U.S. PATENT DOCUMENTS

| | | | |
|---|---|---|---|
| 3,402,120 | 9/1968 | Allen et al. | 204/323 |
| 3,408,432 | 10/1968 | Tumm et al. | 264/84 |
| 3,491,010 | 1/1970 | Ishibashi et al. | 204/171 |
| 3,498,457 | 3/1970 | Gough et al. | 210/85 |
| 3,522,167 | 7/1970 | Allen et al. | 204/323 |
| 3,594,115 | 7/1971 | Wesley et al. | 21/54 |
| 3,770,612 | 11/1973 | Gray et al. | 204/261 |
| 3,841,483 | 10/1974 | Overton | 210/87 |
| 3,922,224 | 11/1975 | Lewandowski | 10/223 |
| 4,061,566 | 12/1977 | Modell | 210/32 |
| 4,077,888 | 3/1978 | Rhoades et al. | 422/186.23 |
| 4,139,438 | 2/1979 | Fey et al. | 204/164 |
| 4,153,527 | 5/1979 | Greenewald | 204/164 |
| 4,169,026 | 9/1979 | Kikuchi et al. | 204/129.65 |
| 4,169,029 | 9/1979 | Smirnov et al. | 205/744 |
| 4,206,364 | 6/1980 | Dixon et al. | 378/119 |
| 4,345,650 | 8/1982 | Wesley | 166/249 |
| 4,367,130 | 1/1983 | Lemelson | 204/157.42 |
| 4,431,901 | 2/1984 | Hull | 219/121.52 |
| 4,458,153 | 7/1984 | Wesley | 250/435 |
| 4,479,680 | 10/1984 | Wesley et al. | 299/14 |
| 4,655,909 | 4/1987 | Furuno | 210/90 |
| 4,664,767 | 5/1987 | Kudo | 204/164 |
| 4,727,236 | 2/1988 | Hull et al. | 219/121.52 |
| 4,731,387 | 3/1988 | Westerterp | 518/706 |
| 4,758,319 | 7/1988 | Klinkowsi | 204/518 |
| 4,761,208 | 8/1988 | Gram et al. | 210/748 |
| 4,812,166 | 3/1989 | Saiki et al. | 75/346 |
| 4,827,224 | 5/1989 | Kershner et al. | 330/294 |
| 4,859,854 | 8/1989 | Kershner | 250/374 |
| 4,917,785 | 4/1990 | Juvan | 204/164 |
| 4,954,683 | 9/1990 | Hatch | 219/121.5 |
| 4,957,606 | 9/1990 | Juvan | 204/164 |
| 4,986,906 | 1/1991 | Dadisman | 204/240 |
| 5,017,751 | 5/1991 | Brecher | 219/121.52 |
| 5,026,464 | 6/1991 | Mizuno et al. | 204/164 |
| 5,026,484 | 6/1991 | Juvan | 210/717 |
| 5,037,524 | 8/1991 | Juvan | 204/307 |
| 5,049,248 | 9/1991 | Muralidhara et al. | 204/545 |
| 5,074,245 | 12/1991 | Ota et al. | 118/719 |
| 5,118,942 | 6/1992 | Hamade | 250/324 |
| 5,142,962 | 9/1992 | Hawke | 89/8 |
| 5,155,290 | 10/1992 | Hawke | 89/8 |
| 5,200,595 | 4/1993 | Boulos et al. | 219/121.52 |
| 5,230,792 | 7/1993 | Sauska | 210/97 |
| 5,233,153 | 8/1993 | Coats | 219/121.47 |
| 5,262,443 | 11/1993 | Topsoe et al. | 518/728 |
| 5,302,881 | 4/1994 | O'Loughlin | 315/111.21 |
| 5,347,126 | 9/1994 | Krauss et al. | 250/309 |
| 5,368,724 | 11/1994 | Ayers et al. | 204/663 |
| 5,397,961 | 3/1995 | Ayers et al. | 315/111.21 |
| 5,437,798 | 8/1995 | LaRoche et al. | 210/761 |
| 5,449,696 | 9/1995 | Dandekar et al. | 518/706 |
| 5,464,513 | 11/1995 | Goriachev et al. | 204/164 |
| 5,484,485 | 1/1996 | Chapman | 118/723 R |
| 5,486,674 | 1/1996 | Lynum et al. | 219/121.52 |
| 5,500,501 | 3/1996 | Lynum et al. | 219/121.48 |
| 5,514,246 | 5/1996 | Blalock | 156/643.1 |
| 5,523,326 | 6/1996 | Dandekar et al. | 518/706 |
| 5,534,231 | 7/1996 | Savas | 216/67 |
| 5,534,232 | 7/1996 | Denes et al. | 422/186.26 |
| 5,540,800 | 7/1996 | Qian | 156/345 |
| 5,541,386 | 7/1996 | Alvi et al. | 219/121.38 |
| 5,543,017 | 8/1996 | Uchiyama et al. | 204/169 |
| 5,552,124 | 9/1996 | Su | 156/345 |
| 5,556,475 | 9/1996 | Besen et al. | 118/723 MP |
| 5,591,969 | 1/1997 | Park et al. | 250/287 |
| 5,603,893 | 2/1997 | Gunderson et al. | 422/22 |
| 5,611,947 | 3/1997 | Vavruska | 219/121.52 |
| 5,633,495 | 5/1997 | Niehuis | 250/287 |
| 5,643,394 | 7/1997 | Maydan et al. | 156/345 |
| 5,647,913 | 7/1997 | Blalock | 118/723.1 |
| 5,660,895 | 8/1997 | Lee et al. | 427/579 |

PHYSICO-CHEMICAL CONVERSION REACTOR SYSTEM WITH A FLUID-FLOW-FIELD CONSTRICTOR

BACKGROUND OF THE INVENTION

The principle of increasing the turbulence of mixed media during chemical reactions is commonly achieved in chemical conversion reactors by the use of nozzles, stirrers, etc.; however, when extra energy needs to be added to the process chemicals it has been proven useful to increase the energy density accordingly—at the point of highest relative motion of the molecules in respect to each other.

During experiments with energy deposition from electrical currents in liquids and gases, it has been shown that the reactor efficiency, Reff, (that is the conversion of chemical compounds passing through the reactor at a single pass) increases when higher energy concentration accompanies higher turbulence.

The reactor efficiency (as defined above) is expressed as the product of: a form factor K (which depends on the reactor geometry and other design parameters), the energy input per useful volume of the reactor (Wdv) and the reaction time (Trv) of the process media in the reactor. This efficiency increases when the same energy input is used at higher energy concentration and correspondingly shorter retention time but at higher dynamic turbulence.

This effect was first observed in reactors that had high energy concentration near electrical electrodes at the point where the electrodes reach into the reactor vessels and when the diameter of the reactor vessels was changed to provide faster or slower fluid flow speeds and correspondingly shorter or longer retention times.

It is believed that this effect is due to the average recombinant time constant of the reactor products that were initially split during the application of electrical currents through the chemical process media.

When the turbulence is high and the reaction products are in their reaction phase, the likelihood of suitable molecules finding their respective counterparts is also high. However, unless there is enough energy available for the desired reaction to work in the saturation region of the reactor all the time (which may not be energy efficient), a certain percentage of the previously excited molecules decay rapidly when no energy is present and these do not undergo reactions, therefore making the reactor efficiency less than 100%.

In random-heat-reactors this effect can be observed by applying different pressures to the process media in the reactor vessel and observing the chemical effects due to the corresponding change in the inter-molecular spacing.

However, even though random-heat-reactors are commonly used (since they are generally fairly easy to construct), random-heat-reactors tend to be inherently somewhat inefficient chemical conversion devices because seldom do their reaction products leave the reactor at the desired end-use temperature, e.g., room temperature, after the process. (Sometimes the overall energy efficiency of the conversion reactor can be improved by using heat recovery methods.)

Better energy use and efficiency can be accomplished in, for example, shock wave driven reactors, ultrasonic or photon activated reactors, or reactors that use radiation or pressures from electrically or mechanically initiated plasmas via shockwaves or high flow speed conditions.

Recent experiments in ethylene conversion using the shock wave generated by a high speed nozzle is one example.

Another example of the dependence of the chemical reactor conversion efficiency on the retention time and mixing conditions (turbulence) is the processing of hydrocarbons (HC) dissolved in water with HO radicals made from hydrogen peroxide under the influence of UV light.

There, with decreasing concentrations of HC the retention times in these reactors have to be increased successively in order to achieve higher and higher purity of the processed water. This is done by splitting the flow into parallel reactors or using reactor vessels with successively larger process media processing volumes connected in series or parallel.

One of the most energy efficient reactors is the ultrasonic or electrohydraulic (EH) type, if overall energy input to chemical product output is used to define energy efficiency. These devices incorporate high turbulence and high energy densities throughout the active reactor-volume.

However, the heat losses in the electrode regions in the electrohydraulic systems and the transducer losses in the ultrasonic type of conversion reactors as well as the losses in the power conversion systems still are detrimental to large system applications.

Plasma reactors can avoid the complexities in the electrical power switching and power systems but the operation of plasma arcs in chemical processing is limited. Depending on the process, the entire process media throughput-volume has to be raised to temperatures which can be as high as the plasma temperature and then cooled down again, which often results in very poor energy management.

DESCRIPTION OF PRIOR ART REACTOR

Referring to FIG. 1, there is shown a prior art conversion reactor 100. In this simple plasma reactor 100, an electrical current is passed between two electrodes separated by the medium to be processed, ionizing the same. If the medium to be processed is unsuitable for this direct ionization, then an indirect method of energy deposition can be used by ionizing a suitable type of gas supplied to the reactor in addition to the primary chemical flow.

The heat and/or radiation generated ionizes the molecules of the process medium causing it to undergo certain chemical and/or physical reactions. By using additives these reaction(s) can be steered in certain ways.

The chemical reactor efficiencies of these devices can be high because by adjusting the flow rate, enough time can be allowed for adequate processing to take place. However, the overall energy balance is not very good because a lot of electricity generated heat is deposited on the electrodes (which have to be cooled); since the internal impedance of the plasma channel is usually fairly low (depending on the reactor pressure), and because only the energy converted within the plasma channel is useful for processing, the rest of the power supplied into the reactor is lost as heat.

FIG. 1 shows the principal elements of its construction. Liquid enters through input Port 102 into the processing chamber 104 and exits through outlet 106. Electrodes 108 and 110 are surrounded by concentric gas channels defined by concentric sleeves 112 and 114 which are supplied with a shielding gas through the gas inlet 116. The gas exits through gas outlet 118.

The entrance and exit ports for the liquid (indicated by the dashed lines) are offset from the axis of the electrodes so that the liquid rotates rapidly inside the chamber.

The liquid rotation forms a void 120 in the liquid at the center of the chamber. The void 120 is filled with the shielding gas, which also rotates due to the gas inlet being offset from the axis of the electrodes. A plasma discharge 122 between the two electrodes is therefore stabilized in the center of this gas bubble in the center of the reactor. Since no solid containment separates the liquid from the arc, the radiation generated by the plasma is transmitted directly into the liquid without the absorption losses through some transparent sleeve that would otherwise have to be used, to separate the liquid from the discharge gas.

A power supply (not shown) connected to the electrodes 108, 110 can be AC or DC, but for operational convenience high voltage pulses or a DC voltage should be superimposed on the supply power bus to reignite the arc instantaneously in case it is extinguished by liquid droplets hitting the hot electrode tips occasionally, or for initial starting purposes.

Several versions of a reactor system like this have been built by the author. If the current supplied to an electrically driven reactor is pulsed with a very fast rise time, an additional effect can be utilized that helps to increase efficiency further:

If a sufficiently fast rising pulse has enough strength to break through in a liquid or gaseous medium, then, during the up ramp of the pulse, the inertia of the media prevents its immediate expansion into surrounding space. This effect is especially pronounced in liquids because of their higher specific gravity.

A pressure build-up within the plasma channel occurs, due to the temperature rise caused by its ohmic heating, which can, depending on the power conditions, have momentary values which may exceed several million psi.

The pressure wave propagates outwards and keeps doing so even after the electrical pulse is over. This shock wave can also break molecular bonds and therefore aid in chemical reactions (Electrohydraulic Processing).

FIG. 2 shows a simplified drawing of such an electrohydraulic reactor 200. The electrodes 202 and 204 are fixed in the reactor case 206 (as shown) or can be fed into it, held by an external fixture or adjustment mechanism (not shown).

Liquid 210 enters the processing region 212 through a bore 214 in one of the electrodes and exits the reactor chamber through output port 216.

A voltage pulse of sufficient strength to break through the liquid space 218 between the electrodes is supplied between them, repetitively. FIG. 2b shows the approximate current pulse shape with the initial pulse rise time ranging anywhere from ¼ to 10 microseconds for a chamber of a few inches in diameter. Applied voltages pulses range from a few kilovolts to about 50 KV depending on the size of the systems and the rise times wanted. Peak currents typically range from a few hundred amperes to around 100 KA or higher.

The arc 220 can break over the gap between the faces of the electrodes at any position between them; however, a shock wave generated by the expansion of the plasma channel into the liquid travels throughout the region indicated by dashed lines 222, losing its intensity in the process, until it hits the walls 224 of the chamber and dissipates the rest of its energy there.

For better operation, a small air space not shown) can be included in the processing chamber, small gas bubbles can be injected into the incoming liquid and the liquid can also be rotated for better uniformity of its exposure. Reversal of the flow direction indicated is possible and can lead to somewhat more uniform flow conditions; however, then the maintenance of a shock-buffering air or gas pocket in the liquid is difficult to achieve.

Because of the higher internal impedence of these devices and the utilization of the pulsewith and its pulse repetition timing, this method is superior in energy efficiency to conventional plasma reactors.

However, many chemical processes require a certain retention time to undergo transformation and therefore, in those cases, the chemical efficiency of these EH reactors is, again, too low to be useful.

SUMMARY

A series of reactors, including the corresponding power systems, having an average power input ranging from a few hundred watts to tens of kilowatts, have been constructed in developing this invention. Experiments have been performed on these systems at different power levels, discharge speeds, using a variety of chemical compounds in molecular disintegration and recombination tests.

The arrangement described by the embodiments of this invention herein avoids both the shortcomings of straight plasma reactors and electrohydraulic processors.

If a narrow fluid flow channel cavity disposed between the electrodes is used, through which the processing medium is passed, (e.g., liquid, gas or even small, fluidized particles can be passed through with the media stream) and if the process media pressure and flow parameters are selected properly, then certain advantages over conventional plasma reactors can be realized.

One embodiment of the chemico-physical materials conversion reactor of this invention includes an input source of a fluid process media (e.g., gas, liquid, fluidized particle mixture or a combination of the same) supplying the fluid at an input pressure to a first chamber. An output sink for receiving a fluid output process media at an output pressure is also provided, the output sink being electrically isolated from the input source.

An electric power supply has electric source and sink connections separately connected electrically between the input fluid source and the output fluid sink. A narrow fluid channel or passage way providing constricted fluid flow therein fluidly couples between the input source and the output sink. The fluid channel is shaped and sized to increase the velocity of input process media flowingly transported there through.

In addition, the fluid channel or passage is arranged to cooperate with the process media flow, the source, sink and power supply, to direct and concentrate therein a significant amount (or essentially all) of the electric field lines (Ec) directed between the source and the sink. The concentration of electric field lines within the constricting channel and increased velocity of the input process media flowing in the constricting channel provides enhanced chemical or physical transformation of the input fluid process media into the fluid output process media.

Objects and Advantages

Depending on the bore diameter of the processing cavity and its length (chosen for a specific flow rate), a high turbulence occurs due to the high flow speed and the friction of the medium at the cavity/channel wall. This aids in the chemical and or physical transformation processes taking place, resulting in more complete chemical reactions or more complete physical transformations (i.e., more efficient conversion).

Because of the larger retention time in the cavity (as compared to the microsecond pulses common in the EH reactors) molecular excitation is upheld over a longer period of time, again resulting in better chemical and or physical transformation performance.

Since the plasma channel is subjected to a higher pressure, its electrical impedance is also higher. Therefore, the percentage of energy deposition in the useful plasma region as compared to the energy deposition at the electrodes is also increased, resulting in better energy efficiency as compared to lower pressure plasma reactors.

Since the machine can be supplied with any kind of electrical current, ranging from DC to fast pulses, the same type of reactor can be tailored to a wide variety of chemical reactions and/or physical transformation applications, simply by adjusting the operating parameters.

This then in turn simplifies manufacturing and reduces the need for a wider variety of different reactor models and sizes (of the same basic design).

If the reactors are run in the DC mode or AC mode, the power supply designs become quite simple, not unlike the designs commonly used to supply plasma arc cutting torches and welders. Then the most troublesome engineering aspect plaguing the pulse power supplies for EH reactors, that is the need to switch very large charges repetitively into the reaction chamber, can be avoided entirely and all the switching mechanisms and energy storage devices can be eliminated.

Regenerative cooling and heat recovery of the processing cavity can be achieved by simple means without the use of external heat exchangers.

Supercritical pressure and temperature operation can be realized simply by adjusting the back pressure of the device accordingly (see references).

The process retention time span can be selected as desired for any cavity configuration needed (length to diameter ratio). While the cavity length is chosen primarily according to the retention time needed, the cavity diameter is a function of the turbulent conditions required and the radiation penetration depths and energy density conditions achieved by the power system used.

Arc stabilization can easily be achieved by rotating the liquid process media at sufficient speed in the processing zone (reaction chamber or cavity), resulting in a steady and controlled plasma channel in its center.

The rotation of the process medium, whether it be liquid or gas, also results in a longer effective (spiral) path length, i.e., a helical path through a rotating region, for the process media in the processing zone thus increasing the time available for the reactions to take place.

Since the primary processing occurs in the reaction zone cavity only, a 100% volumetric efficiency can be achieved there. The problems associated with other reactors, in which a certain percentage of the incoming unprocessed process media nearly always mixes with the already processed media,(due to unavoidable turbulence at or near the edges of the processing regions), thereby contaminating it, are therefore avoided. This cross-contamination lowers the reactor efficiency on some types of prior art chemical conversion reactors and/or sometimes makes multiple passes necessary. By confining the media into an accurately defined space, this mixing (by undesired turbulence) is therefore avoided or minimized.

DESCRIPTION OF DRAWINGS

FIG. 2b is a graph of a fast rising plasma generating current pulse used in the reactor of FIG. 2.

DETAILED DESCRIPTION OF THE INVENTION

Figure 1:
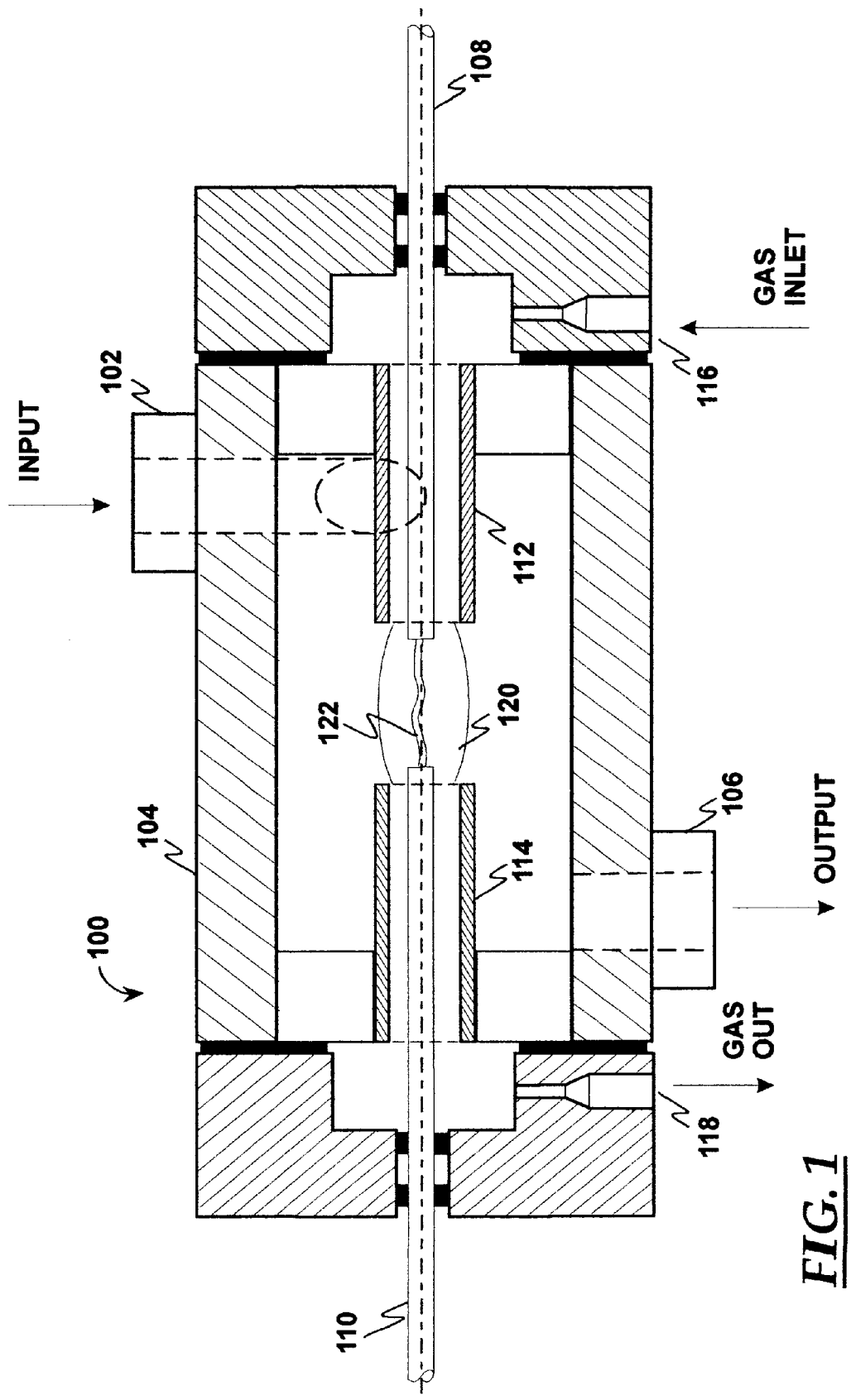
FIG. 1 is a schematic of one type of prior art continuous flow plasma conversion reactor.
Figure 2:
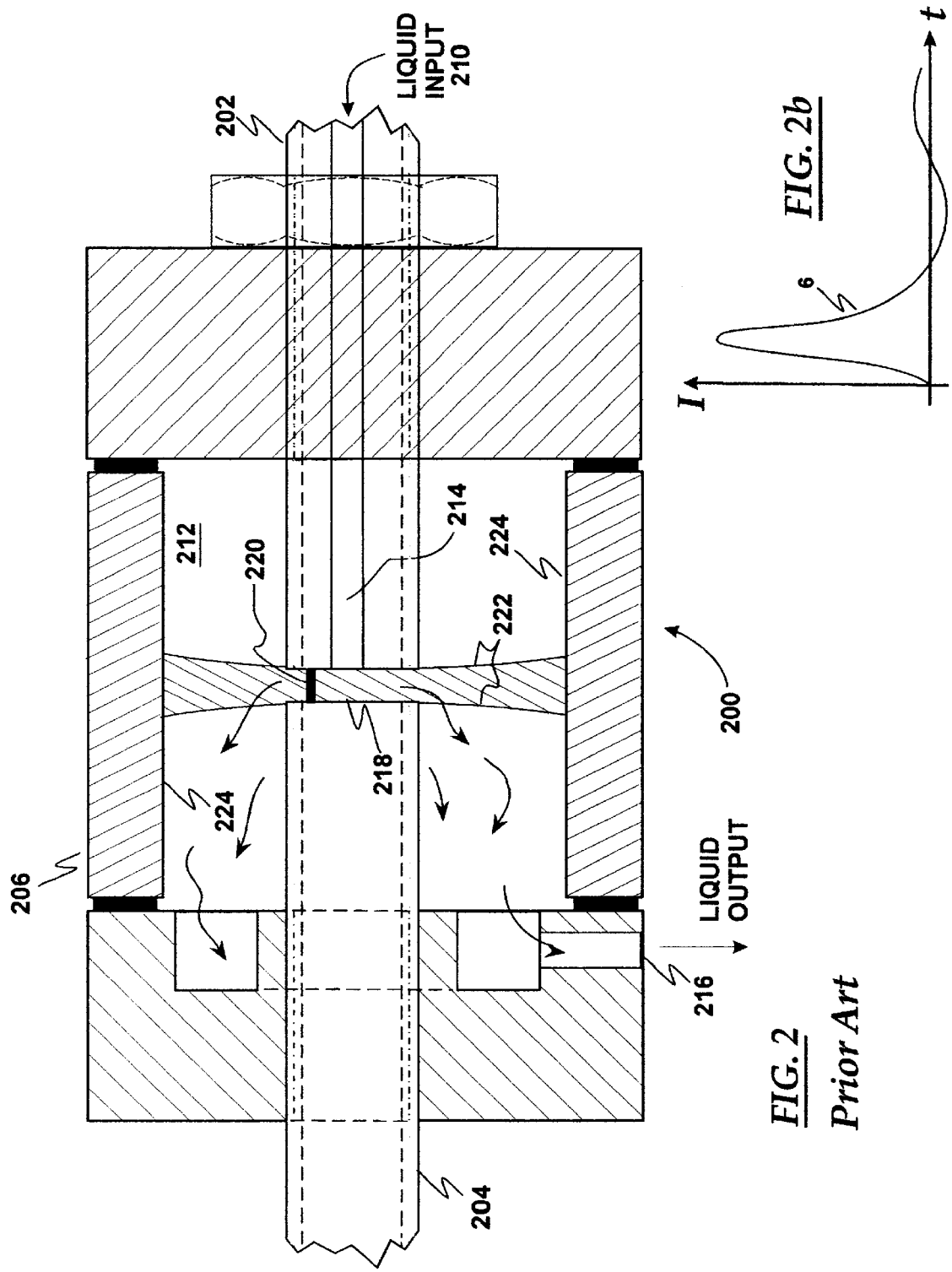
FIG. 2 is a simplified schematic of a previous pulse plasma reactor of the ElectroHydraulic type conversion reactor.
Figure 3:
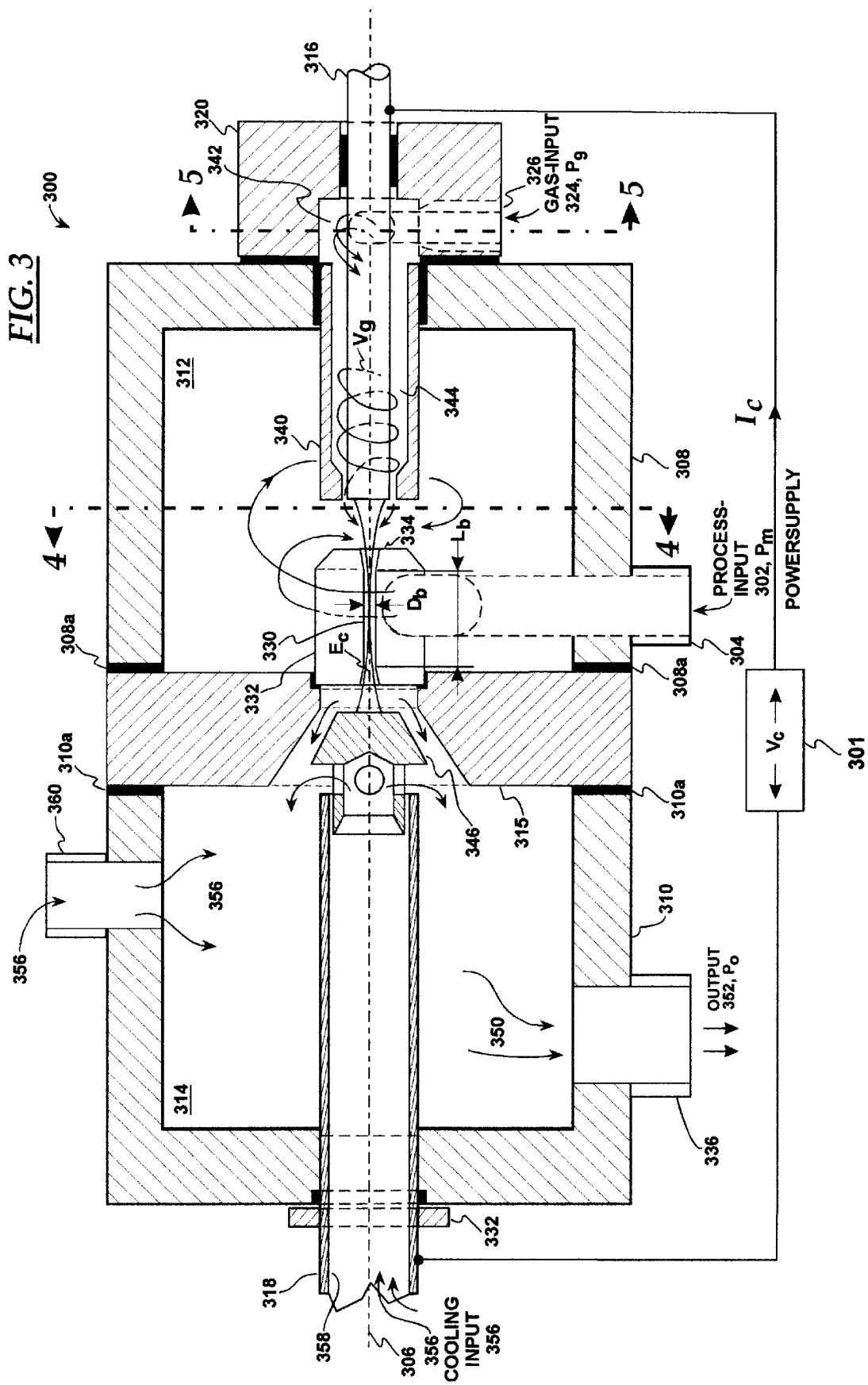
FIG. 3 is a elevation cross section of one embodiment of a Field-Flow Constrictor physico-chernical conversion reactor in accordance with the present invention.

With regard to FIG. 3 there is shown a schematic cross section of one preferred embodiment 300 of the improved physico-chemical conversion reactor of the present invention. A power supply 301 supplies electrical current, Ic, at a voltage Vc, to electrically isolated and spaced apart electrodes 316 and 318. If DC current, Ic, is used for plasma generation the asymmetrical anode/cathode arrangement, shown in FIG. 3, can be more advantageous (because of the unequal heating of the respective electrodes). In the case of AC excitation by the current Ic, a symmetrical arrangement of the electrodes 316 and 318 may be advantageous.

It also should be pointed out that for certain process media conversion processes such as, for example, the biological decontamination of liquid process media or for processes involving molecular electrolysis, no plasma arc has to be generated for media conversion processing since the media are already conductive and lower energy densities are sufficient.

In the reactor 300, when processing a conductive liquid process media, the current Ic, can be passed through the process media channel directly, without resulting in a gaseous ionization trail ionizing the process media. The difference in its operation setup would be the type of power supply that would be used. (AC/DC or pulsed AC or DC) at a supply voltage, Vc, not high enough to cause dielectric breakdown of the process media in the reaction zone but with sufficient potential to drive the required process current, Ic, through the process media in the reaction zone bore.

The apparatus 300 shown in FIG. 3 is an example of the use of a Flow-Field Constrictor (FFC) in a chemical conversion reactor for enhancing both electric field intensity and turbulence conditions in the flow of process media within the reaction zone bore. This one example is not presented as, and is not intended to be interpreted to represent the only possible configuration for chemical reactor conversion efficiency improvements within under the scope of the present this invention.

The basic requirements on the FFC (the constrictor) fundamental to the present invention are the material and dimensions of the same, in relation to the power density, current density, the electric field intensity, the process media and the media flow rate in the bore. In embodiments requiring the presence of an ionizing arc, an additional arc stabilization means (in the center of the reaction bore) may also be employed suitable for the specific media flow and power conditions required for the particular chemical processes under consideration.

Figure 4:
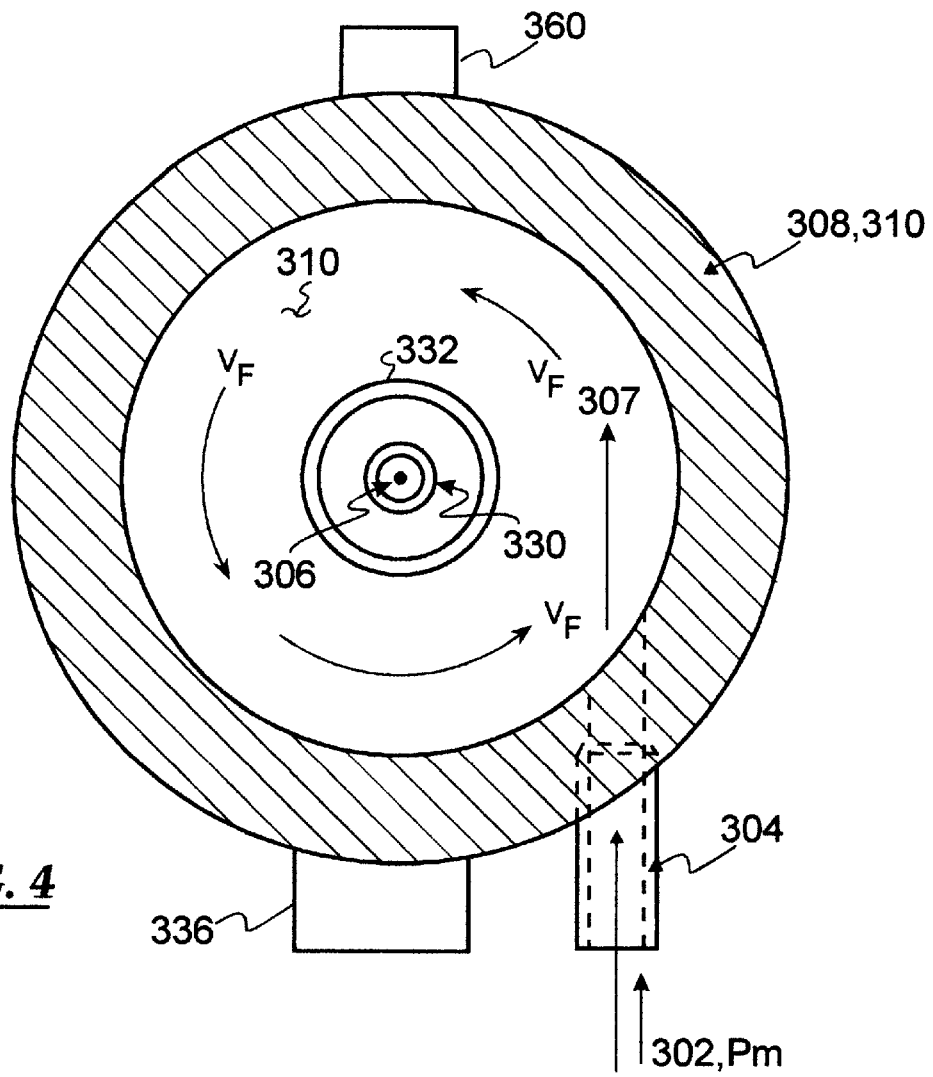
FIG. 4 is a detail cross section along the line 4—4 of FIG. 3.

A fluid medium (e.g., a gas, liquid or fluidized particle composition or combinations thereof) to be processed (process media influent 302) enters the reactor 300 through media input inlet 304 from a media source (not shown) at a specified media source pressure (Pm) and flow rate (Fm not shown). Referring to FIG. 4, the inlet 304 is located off-center with respect to reactor central axis 306 and directed to inject the media influent 302 in the direction of a chord 307 displaced from the axis 306 so as to provide a rotational or vortex flow (indicated by arrows Vf) of the influent 302 around the central axis 306 within the reactor 300.

Cup-shaped distal inlet chamber wall 308 and opposing cup-shaped distal outlet chamber wall 310 are aligned along the axis 306 with open proximal faces 308a and 310a, and are sealed to opposite faces of an electrically isolating disc 315 therebetween. The cup-shaped walls 308, 310 and corresponding opposed faces of disc 315 define two isolated and spaced apart media chambers 312, 314 respectively. A cylindrical Field-Flow Constrictor body 332 has a front face 334 and a back face 336 with reaction zone bore 330 defined therethrough. The bore 330 is aligned with the central axis 306. The back face 336 is sealed to the isolating disc 315 limiting process media 302 to flow between the inlet chamber 312 and the outlet chamber 314 only through the bore 330.

The electrically isolated and spaced apart first and second cylindrical electrodes, 316 and 318, are held rigidly and fed separately through opposed electrode receiving aperture seal assemblies, 320 and 322 mounted on the opposed distal chamber walls 308 and 310 respectively. Aperture seal assemblies 320 and 322 form gas and liquid tight sealed apertures for receiving the respective electrode through the corresponding chamber wall.

The electrodes 316 and 318 are axially aligned along the central axis 306. The electrodes 316 and 318 have respective opposing electrode ends spaced from and proximally facing toward the corresponding front face 334 and the back face 336 of the constrictor body 332.

Electric field lines, Ec, between the two electrodes 316, 318 are constricted and forced to channel only through the reaction zone bore 330 since the insulating disc 315 electrically isolates electrode 316 from 318. The process media 302 flowing through the bore 330 provides a conductive path (in the case of a conductive media). In alternative embodiments of the reactor 300, where the process media is non-conductive, a plasma arc (not shown) will be ignited with sufficient voltage, Vc, and channel the electric field lines, Ec there through.

In any event, the constricting effect of the bore 330 intensifies not only the flow of the process media, i.e., its velocity, but the electric field intensity within the bore 330. This doubly increases the benefit of increase chemical reactivity for the conversion processes within the reaction zone bore 330. At sufficiently high fluid velocity, the flow of the process media 302 in the channel 330 becomes turbulent, further adding to the reactivity in the bore 330.

Figure 5:
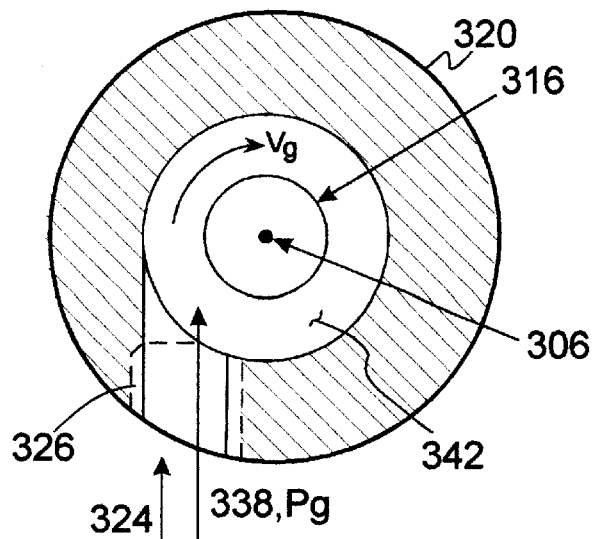
FIG. 5 is a detail cross section along the line 5—5 of FIG. 3.

With regard to FIG. 5, a gas 324 suitable for the desired process (shielding or reacting gas as may be required by the desired conversion reaction) is fed from a gas source (not shown), at a pressure (Pg) and flow rate, (Fg not shown), ) through a distal gas inlet 326 to a cylindrical gas receiving chamber 342. The chamber 342 is disposed surrounding a distal portion of electrode 316 provided in the seal assembly 320. The gas inlet 326 directs the gas 324 in the direction of a chord 338 offset from the central axis 306 and the center of the electrode 316 such that gas 324 flows helically around the electrode 316 toward the inlet chamber 312. A tubular sleeve 340 concentrically surrounding and spaced apart from the electrode 316 extends from its proximal end, distally parallel along the axis 306 through the wall 308 to the gas receiving chamber 342 defined within the seal assembly 320, forming a concentric toroidal channel 344 therebetween. The gas 324 from the inlet 326 flows in a helical path indicated by arrows Vg through the channel 344 toward the face 334.

Both process media 302 and gas 324 pass through the reaction bore 330 defined in the constrictor body 332. The media 302 and gas 324 flow through the bore 330 with respective flow rates Fm and Fg. Flow rates Fm, Fg are determined by the diameter, Db, of the bore 330 and the respective source and sink pressure, Pm and Po.

While flowing axially through the bore 330, the gas 324 and process media 302 form concentric rotating flowing streams (helical-rotational flows, not shown) that rotate and tend to separate radially from one another according to their specific gravities.

The helical-rotational flow of process media 302 within the bore 330 induced from the chamber flow (Vf) and electrode channel flow (Vg) acts to sustain a vortex-stabilized arc.

After reaction in the reaction zone bore 330, reaction products 350 flow distally from the bore 330 toward the electrode 318 and impinge on a proximal end of electrode 318.

The proximal end of electrode 318 is provided with an electrically conductive truncated conical deflector 346 to direct the output reactant flow 350 into the outlet chamber 314. The output reactant 350 flows from the outlet chamber 314 and exits as effluent 352 at an exit pressure, Po, through a outlet port 336 defined in the outlet chamber wall 310.

The materials and composition of gas 324 is chosen based on the particular process requirements indicated for the process media and conversion process desired. The gas 324 can be inert relative to the process of interest and/or can act as the conductive path for a plasma arc. Alternatively, the gas 324 can be selected to be an active component of the reaction in the reaction zone.

The reaction zone bore 330 is sized to provide the necessary electric field concentration, and process media velocity characteristics required for the media and conversion process desired. The literature is replete with data and theoretical analyzes which can be used by one knowledgeable in the relevant art to select values of bore diameter, Db and length, Lb, depending on the conversion media and process of interest. The driving voltages, and currents, the relative spacings and dimensions of the other elements, i.e., the electrodes, 316, 318 diameter and length, the body 332 diameter and thickness, the chamber walls 308, 310 diameter and thickness, etc,. may be selected by those having skill in the relevant art.

The materials required for the various elements may be selected for the relevant pressures, temperatures and corrosion resistance for the process and conversion media of interest. The combination of the walls 308, 310, the constrictor 332, the bore 330 and the separating disc 315 must only meet two absolute requirements: (1) the combination 308, 310, 315 form two electrical connections isolated from each other and connected respectively to corresponding input media 302 and output media 350 in their respective chambers 312, 314 sufficient to support the electric driving potential, Vc, therebetween with a sufficiently low loss of driving current Ic to effect the desired conversion process; (2) the relevant configuration, shapes, spacings and dimensions of the elements of the reactor 300 and the flow rates of the media in the reaction zone provide the desired level of turbulence, i.e., fluid velocity, whether composed of purely axial velocity along the central axis 306 of the reaction bore; or of a combination of axial (along axis 306) and rotational (spiral or helix about the axis 306)

Choice of the shielding/reacting gas 324 and the differential rotational speeds of shielding gas 324 and process media 302 acts to stabilize the electric current, Ic, through the reaction bore 330 with the highest concentration of field lines, Ec, in the region of the center line of the bore 306. In embodiments of the invention utilizing an arc discharge in the reaction zone 330, that would be the position of the plasma arc also.

After the gas/media reaction mixture 350 exits the bore 330 and gives up (mostly) any electrical charge to electrode tip 346, extra cooling or additional process media 356 (post-process injection stream) can be added into the outlet chamber 314 either through an output electrode cooling bore 358 in the electrode 318 (and can also be used for electrode cooling there), or by injecting it into the chamber 314 through additional cooling port 360 or both. This additional cooling/process media 356 is provided by external sources (not shown).

By adding the additional cooling/process media 356, depending on the chemical composition of the process media, the composition of the post-process injection stream 356, and respective ratios and flow rates, output process media 352 chemical reactions can be influenced.

Cooldown of the output process media 352 emitted from the high energy environment of the constrictor bore 330 is also possible to achieve by this means.

A prototype of the reactor 300 was made with a glass Field-Flow Constrictor body 332 having a reaction zone bore 330 of diameter Db=0.044 inches and a length Lb=0.30 inches. Initial conversion experiments with NaOH, various diluted acids and hydrocarbon solutions in water as the process media 302 were performed using flow rates Fm, of 1/10 to 1/100 gallons per minute, voltages Vc of 1 to 5 KV. Observations showed acceptable pH conversion ratios and HC reduction values sufficient to prove the concept of improved conversion efficiency of this type of constricted bore conversion reactor.

Applicability of the present invention to Chemical Conversion Processes

Numerous scientific and technical publications are available that discuss the conditions needed for various chemical conversion processes. A limited example of some of the processes suitable for use with the present invention are listed here below and are incorporated herein by reference. Selection of a suitable Field-Flow Constrictor bore diameter, and length for a specific conversion process may be made by those knowledgeable in the relevant electrical, thermodynamic and fluid flow engineering arts—coupled with choosing fluid pressures and flow rates by reference to the cited literature and the present invention.

Reference List

Juvan, U.S. Pat. No. 4,957,606 Sept. 18,1990.
Separation of dissolved and undissolved substances from liquids and gases. Column-line no. 30-15 31-60.
Chemtech April 1996.
Electrohydraulic destruction of hazardous wastes pg. 56.
Doevenspeck, German Patent #0148380 Dec. 9, 1983.
Electroimpulsverfahren zur Behandlung von Stoffen and Vorrichtung zur Durchfuhrung des Verfahrens.
Gesundheitsingenieur Vol. 74, 1953 (Germany).
Niederer Wechselstrom and Biologische Abwasserieinigung & Faulgasgewinnung.
Berichte der Abwassertechnischen Vereinigung Vol. 12 1960, Pg. 100.
Liebmann & Offhaus, Moglichkeiten zur Intensivierung der Schlammausfaulung.
Gram et al, U.S. Pat. No. 4,761,208 Aug. 2, 1988.
Electrolytic Method and Cell for Sterilizing Water.
Ayers et al, U.S. Pat. No. 5,368,724 Nov. 29, 1994.
Apparatus for Treating a Confined Liquid by Means of a Pulse Electrical Discharge Pg. 9-55.
Juvan, U.S. Pat. No. 4,957,606 Sept. 18, 1990.
Separation of dissolved and undissolved substances from liquids and gases.
33-30
33-60
35-5
36-15
30-15
31-60
34-30.
Chemtech, April 1996.
Electrohydraulic Destruction of Hazardous Wastes.
Pg. 54.
R.& D. Magazine, Chemical and Petrochemical Research, Dec. 1996.
Shock-Wave-Cracking Technology
Pg. 26.
Model, U.S. Pat. No. 4,061,566, Dec. 6, 1977.
Process using supercritical fluid for regenerating synthetic organic polymeric adsorbents and Wastewater treatment embodying the same.
Pochner, Neff, Germany DE 4440813A1. May 18, 1995.
Verfahren zur Behandlung von Flussigkeiten.
1-5.
Gray et al., U.S. Pat. No. 3,770,612, Nov. 6, 1973.
Apparatus for electrolytic oxidation of reduction, concentration, and separation of elements in solution.
8-25 through 10-40.
James Lauer, Penn Wyane, U.S. Pat. No. 3,240,689, Mar. 15, 1966.
Catalyzed Shock-tube reactions.
4-15.
Lahr, Amherst, & Lamprey, U.S. Pat. No. 2,958,716, Nov. 1, 1960.
Process for using shock-waves to produce Acetylene.
5-50
8-45.
Ishibashi, U.S. Pat. No. 3,491,010, Jan. 20, 1970.
Method for cracking liquid hydrocarbons in an electrical discharge.
2-30 through 2-60.
Modell, Sobczynski.
Supercritical Water Oxidation of Pulp-Mill-Sludges, D.O.E., Tappi Journal, June 1992.
Pg. 198.

Vavruska, U.S. Pat. No. 5,611,947, Mar. 18, 1997, (abstract).

Induction Steam Plasma-Torch for generating a steam plasma for treating a feed-slurry.

Gray et al., U.S. Pat. No. 3,770,612, Nov. 6, 1973.

Apparatus for electrolytic oxidation or reduction, concentration or separation of elements in solution.

8-25 through 10-40.

Wesley, Richard, U.S. Pat. No. 3,220,873, Nov. 30, 1965.

Coating and impregnating of articles by spark generated shock waves.

5-35- removal of carbon.

I claim:

1. A materials conversion reactor for the processing of liquids and solid particles suspended in liquid, based on a flow-field constrictor, where the conversion of said materials takes place within the confines of a bore of the constrictor, comprising:

(a.) Two fluid reservoirs acting as input and output manifolds respectively, having different hydrostatic pressures and being at opposing electrical potentials, connected via a narrow flow channel;

(b.) The flow field constrictor constructed of electrical insulating materials, transferring the liquid process media from one reservoir to the other;

(c.) A means for generating plasma arc passing through the center of the constrictor bore, formed by the increased field strength of the electrical field within that bore, running coaxially through the center and originating from either one or both liquid surfaces at the end of the constrictor bore;

(d.) An electrical power source, supplying either AC, DC or electrical pulses to the liquid process media volumes at either side of the constrictor bore—of such strength, that the power supplied to the process media during its passage through the constrictor bore provides for the conversion energy levels necessary for the desired physical or chemical reactions to take place.

2. An apparatus, according to claim 1, in which the energy discharge inside the constrictor bore consists of a high density electrolytic current, carried by the liquid process media.

* * * * *